United States Patent [19]

Neofitou

[11] Patent Number: 5,292,039
[45] Date of Patent: Mar. 8, 1994

[54] LIQUID MEASURING DISPENSER

[76] Inventor: John M. Neofitou, 2 Graham Dr., Newport News, Va. 23606

[21] Appl. No.: 103,690

[22] Filed: Aug. 10, 1993

[51] Int. Cl.$^5$ ............................................. G01F 11/28
[52] U.S. Cl. .................... 222/424; 222/158; 222/441; 222/442; 222/454; 222/470; 222/482
[58] Field of Search .............. 222/158, 424, 441, 442, 222/454, 222/455, 465.1, 468–470, 475, 481, 482

[56] References Cited

U.S. PATENT DOCUMENTS

| | | | |
|---|---|---|---|
| 1,791,452 | 2/1931 | Ljungman | 222/454 X |
| 2,279,728 | 4/1942 | Ballard | 222/424 X |
| 2,428,233 | 9/1947 | Livadas | 222/455 |
| 2,524,125 | 10/1950 | Haid | 222/454 |
| 2,532,787 | 12/1950 | Romyns | 222/442 |
| 2,645,388 | 7/1953 | Hester | 222/454 |
| 3,141,574 | 7/1964 | Donoghue | 222/158 X |
| 3,217,948 | 11/1965 | Mullen | 222/424 |
| 3,254,809 | 6/1966 | Breneman | 222/442 |
| 3,429,485 | 2/1969 | Harkay | 222/442 |
| 3,616,971 | 11/1971 | Kutik | 222/249 |
| 4,298,038 | 11/1981 | Jennings | 222/454 X |
| 4,324,349 | 4/1982 | Kaufman | 222/207 |
| 4,509,659 | 4/1985 | Cloutier et al. | 222/444 X |
| 4,625,897 | 12/1986 | Wortley | 222/205 |
| 4,646,948 | 3/1987 | Jennings | 222/158 X |
| 4,666,065 | 5/1987 | Ohren | 222/424 X |
| 4,779,767 | 10/1988 | Griffiths | 222/205 |
| 4,819,833 | 4/1989 | Huddleston et al. | 222/441 X |
| 4,860,927 | 8/1989 | Grinde | 222/454 X |
| 5,119,971 | 6/1992 | Reyman | 222/454 X |
| 5,127,553 | 7/1992 | Weinstein | 222/158 |

FOREIGN PATENT DOCUMENTS

| | | | |
|---|---|---|---|
| 2851449 | 5/1979 | Fed. Rep. of Germany | 222/454 |
| 2601652 | 1/1988 | France | 222/454 |
| 7712828 | 5/1979 | Netherlands | 222/158 |
| 2116522 | 9/1983 | United Kingdom | 222/454 |

Primary Examiner—Kevin F. Shaver
Attorney, Agent, or Firm—Richard C. Litman

[57] ABSTRACT

A bottle for storing a liquid and dispensing measured quantities thereof. The bottle has a large storage chamber and a small measuring chamber, each chamber including its own threaded, removable cap. The measuring chamber is adjacent and partially above the storage chamber, an opening extending and communicating therebetween. The opening opens to the top of the storage chamber and to the middle of the measuring chamber. A conduit controlled by a manually operated valve extends and communicates between the lowermost portion of the storage chamber and the lowermost portion of the measuring chamber. In a preferred embodiment, the conduit forms a loop with the remainder of the bottle, thus serving as a handle. In this embodiment, the manual valve is located such that it is operated by the hand grasping the handle. In use, the bottle is first inverted, and the valve held open, so that stored liquid fills the measuring chamber. The bottle is then righted, a quantity of liquid being retained within the measuring chamber. This quantity is selectively adjusted by opening the valve, enabling a portion of liquid to return to the storage chamber. Graduation indicia enable a user to retain a desired quantity of liquid in the measuring chamber. This liquid is dispensed by removing the measuring chamber cap and pouring out the measured liquid.

7 Claims, 3 Drawing Sheets

LIQUID MEASURING DISPENSER

BACKGROUND OF THE INVENTION

1. FIELD OF THE INVENTION

The present invention relates to a container for holding and dispensing a measured quantity of a liquid.

2. DESCRIPTION OF THE PRIOR ART

Hand held squeeze bottles for dispensing measured quantities of liquid have been the subject of prior patents. In a measuring and dispensing bottle having a storage chamber, a second chamber for measuring is seen in U.S. Pat. No. 3,141,574, issued to Robert J. Donoghue on Jul. 21, 1964, and U.S. Pat. No. 4,625,897, issued to Michael Wortley on Dec. 2, 1986. Unless the bottle of Donoghue '574 is held in an inverted position, liquid can return to the storage chamber. The bottle disclosed in Wortley '897 includes a tube discharging liquid from the storage chamber to the dispensing chamber at a point high in the latter, so that a significant amount of liquid can accumulate without draining back to storage.

U.S. Pat. No. 5,119,971, issued to Mark E. Reyman on Jun. 9, 1992, shows another dispensing bottle wherein a measuring chamber is filled when the bottle is inverted, and excess liquid is returned to storage when the bottle is returned to upright. Return is automatically performed, by flow enabled when the bottle is appropriately oriented with respect to upright. Dispensing is accomplished by pressure brought to bear by squeezing the bottle.

A dispensing container having an air lock for scavenging an outlet passageway and for preventing liquid discharge from the container is disclosed in U.S. Pat. No. 4,324,349, issued to John G. Kaufman on Apr. 13, 1982.

U.S. Pat. No. 4,779,767, issued to Daniel J. Griffiths on Oct. 25, 1988, discloses a dispensing container bearing similarities to the above inventions, and further incorporating a float valve to prevent overfilling of the measuring and dispensing chamber. Another valve, in this case a sphere retained within a chamber, is seen in U.S. Pat. No. 5,127,553, issued to Jack Weinstein on Jul. 7, 1992.

U.S. Pat. No. 3,616,971, issued to Louis F. Kutik on Nov. 2, 1971, discloses a dispensing container featuring a propellant under pressure, and valving for measuring and dispensing a liquid.

None of the above inventions and patents, taken either singly or in combination, is seen to describe the instant invention as claimed.

SUMMARY OF THE INVENTION

The present invention provides a bottle for storing a liquid and dispensing measured quantities thereof. The bottle has a large storage chamber and a small measuring chamber, each chamber including its own threaded, removable cap. The measuring chamber is adjacent and partially above the storage chamber. A small orifice located in a common wall of the bottle communicates between the storage and measuring chambers. The orifice is located toward the top of the storage chamber and toward the middle of the measuring chamber.

A conduit controlled by a manually operated valve extends and communicates between the bottom of the storage chamber and the bottom of the measuring chamber. The valve comprises a spring biased button having a through bore therein. When the through bore aligns with the passageway in the conduit, fluids can flow therethrough. In a preferred embodiment, the conduit forms a loop with the remainder of the bottle, thus serving as a handle. In this embodiment, the manual valve is located such that it is conveniently located for thumb op hen a holder is grasping the handle in pistolgrip fashion.

In use, the bottle is first inverted, (partially or fully at least beyond a horizontal plane) and the valve held open, so that stored liquid fills the measuring chamber. The bottle is then righted, a quantity of liquid being retained within the measuring chamber, and excess fluid being recirculated to the storage chamber. The retained quantity is selectively adjusted by opening the valve, enabling a portion of liquid to return to the storage chamber. Graduation indicia enable a user to retain a desired quantity of liquid in the measuring chamber. This liquid is dispensed by removing the measuring chamber cap and pouring out the measured liquid.

The respective openings within the measuring chamber of the conduit and of the orifice are hooded, and open downwardly. This helps maintain liquid to remain in the measuring chamber, and not flow back into the storage chamber, as by siphoning action, or under influence of gravity.

Accordingly, it is a principal object of the invention to provide a bottle providing storage of a liquid and having a measuring chamber for measuring and dispensing a portion of that liquid.

It is another object of the invention to provide a measuring and dispensing bottle having means for isolating a predetermined quantity of liquid for subsequent dispensing.

It is a further object of the invention to provide a measuring and dispensing bottle which is readily grasped and operated with one hand.

Still another object of the invention is to provide a measuring and dispensing bottle having manually attached and removed closures enabling respective, but separate, access to the storage and measuring chambers.

It is an additional object of the invention to provide a measuring and dispensing bottle having a handle housing a passageway communicating between storage and measuring chambers.

It is still a further object of the invention to provide a measuring and dispensing bottle having two separate fluid paths communicating between the storage and measuring chambers, wherein the two fluid paths terminate at locations within the storage and measuring chambers such that return of liquid from the measuring chamber back to the storage chamber is prevented when one of the fluid paths is blocked by a manually operated valve.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
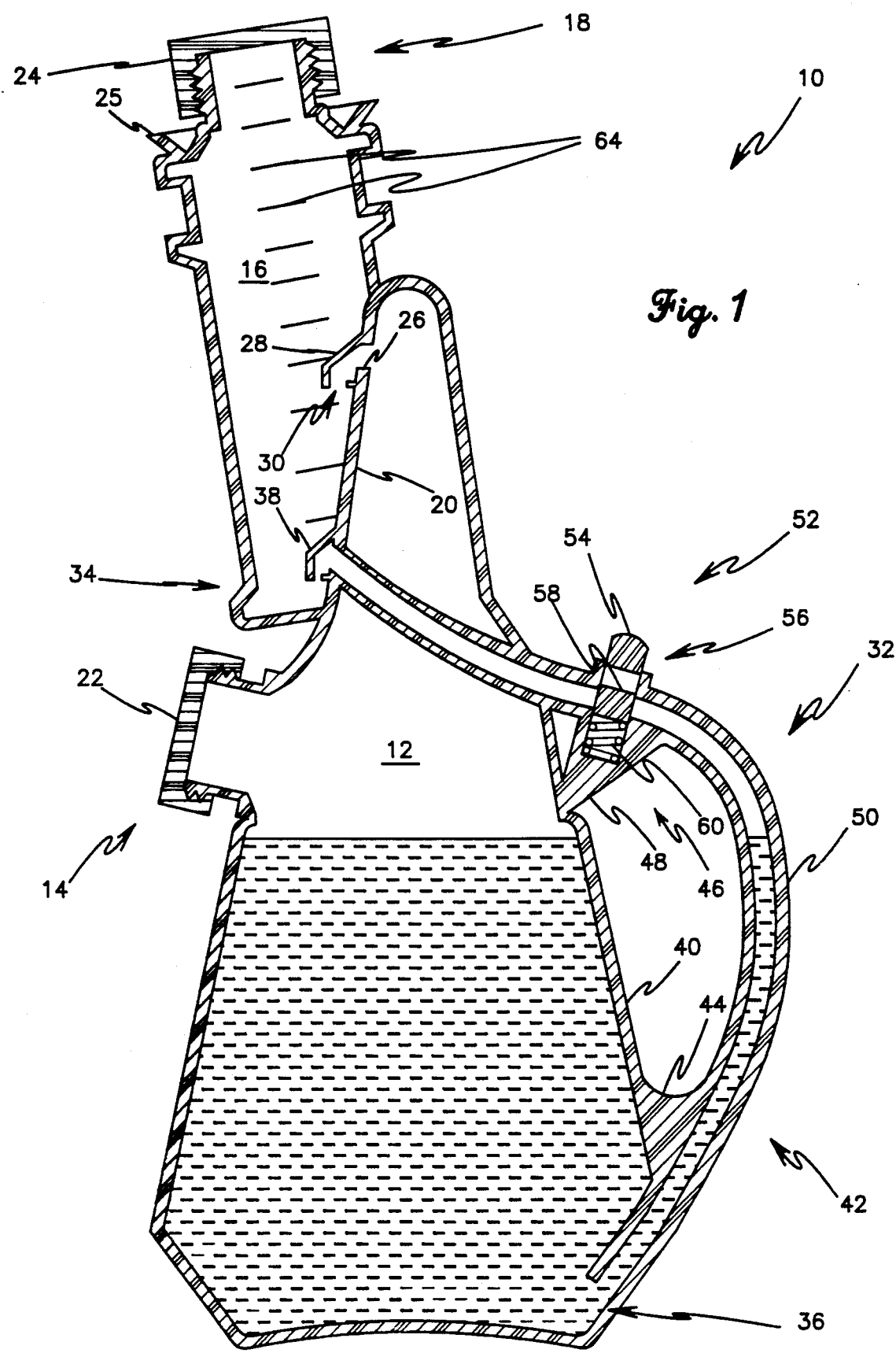
FIG. 1 is a partly exploded, cross sectional, side elevational view of the invention.

The present invention is seen in FIG. 1 to comprise a bottle 10 comprising two principal chambers. These chambers include a main storage container 12 having an opening 14 for refilling, and a measuring vessel 16 having an opening 18 for dispensing. Measuring vessel 16 is formed with storage container 12 at a location such that the top of storage container 12 coincides roughly with a vertical center of measuring vessel 16, there being a common wall 20 separating the two chambers.

Openings 14 and 18 are threaded, so as to cooperate with corresponding removable caps 22 and 24. A lip 25 encircles opening 18 to trap dripping liquid from a prior use.

Two separate and distinct fluid paths communicate between the two chambers. A short passageway 26 is formed in common wall 20. Wall 20 is extended so as to define a hood 28 covering passageway 26 as it opens into measuring vessel 16. An opening 30 is thus provided which faces downwardly into measuring vessel 16.

A liquid conduit 32 is formed in bottle 10 extending from the lowermost portion 34 of measuring vessel 16 to a corresponding lowermost portion 36 of storage container 12. In a manner similar to that by which hood 28 terminates passageway 26, a second hood 38 is formed wherein conduit 32 penetrates common wall 20.

For structural and aesthetic reasons, conduit 32 describes a long, sweeping path between its terminals. Starting at lowermost portion 36 of storage container 12, conduit 32 extends parallel to bottle outer wall 40, and at a point of divergence 42, penetrates therethrough, there being a small gusset 44, and forms an arc. The arc bends back toward bottle outer wall 40, and at a point of convergence 46, conduit 32 rejoins outer wall 40, forming a large gusset 48. Of course, bottle 10 could, if desired, be formed such that there are voids or dead spaces (not shown) formed in gussets 44 and 48.

After converging with outer wall 40, conduit 32 passes through the chamber of storage container 12, and intercepts common wall 20. The circuitous pathway thus described enables conduit 12 to provide a handle 50 which is formed integrally with bottle 10.

Figure 2:
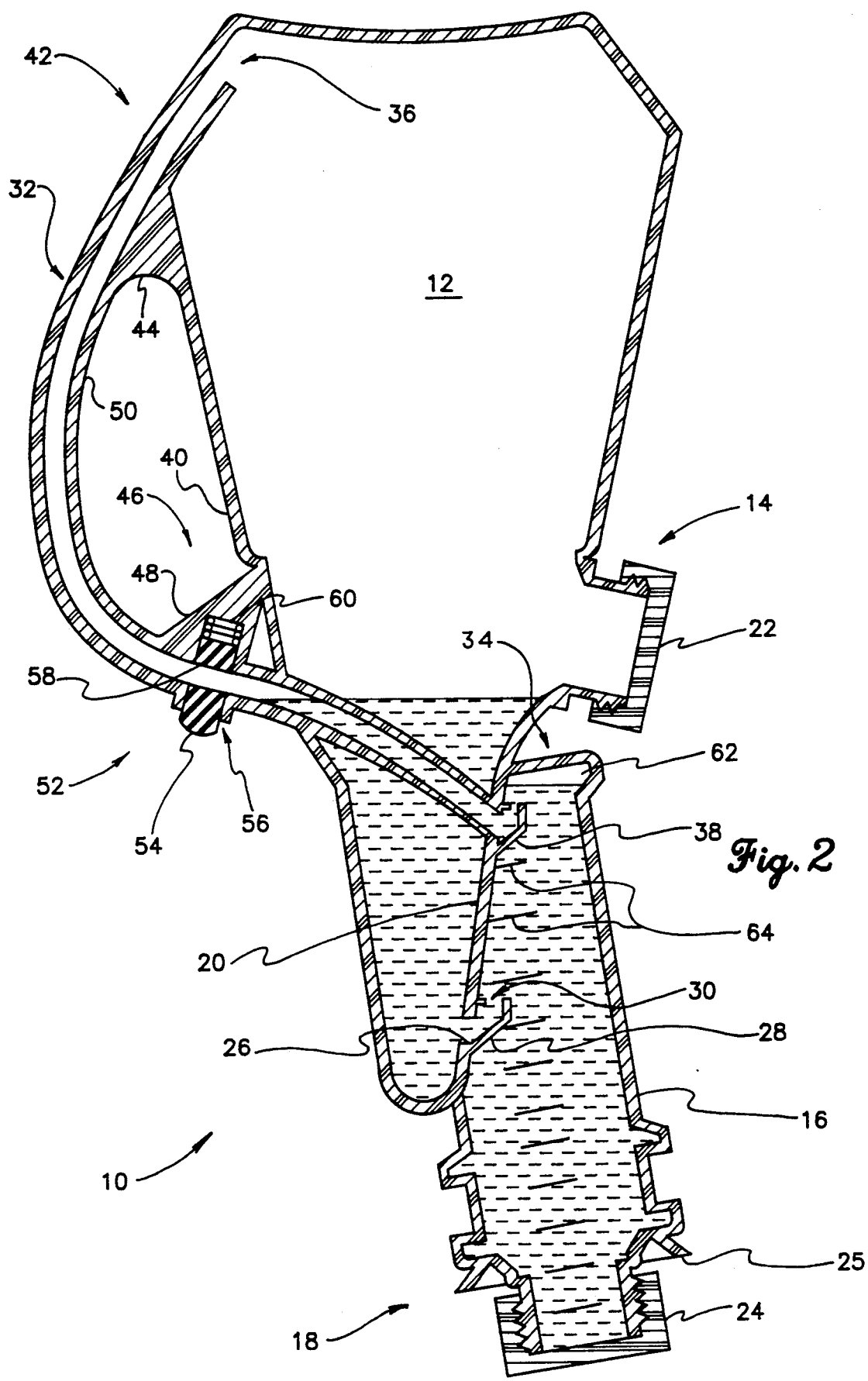
FIG. 2 is a cross sectional, side elevational view of the invention held inverted, to fill the measuring chamber.

Gusset 48 is sufficiently large as to house a valve 52. Valve 52 comprises a button member 54 housed in a cylindrical bore 56 formed in gusset 48. Button member 54 has an orifice 58 to enable continuity of the flow path, when properly aligned with the passageway formed in conduit 32. Button member 54 is biased by a spring 60 into misalignment of orifice 58 with the flow path of conduit 32. Depressing button member 54 aligns orifice 58 and the flow path, thereby opening valve 52 (see FIG. 2). Button member 54 is located so that it is conveniently accessible to a user's thumb when handle 50 is grasped in typical pistolgrip fashion.

The novel bottle 10 is used as follows. Starting with the bottle upright, and storage container 12 at least partially filled with a liquid to be dispensed, as shown in FIG. 1, bottle 10 is inverted (FIG. 2), and button member 54 is depressed. Liquid fills measuring vessel 16, leaving only a small pocket of air, generally indicated at 62.

Figure 3:
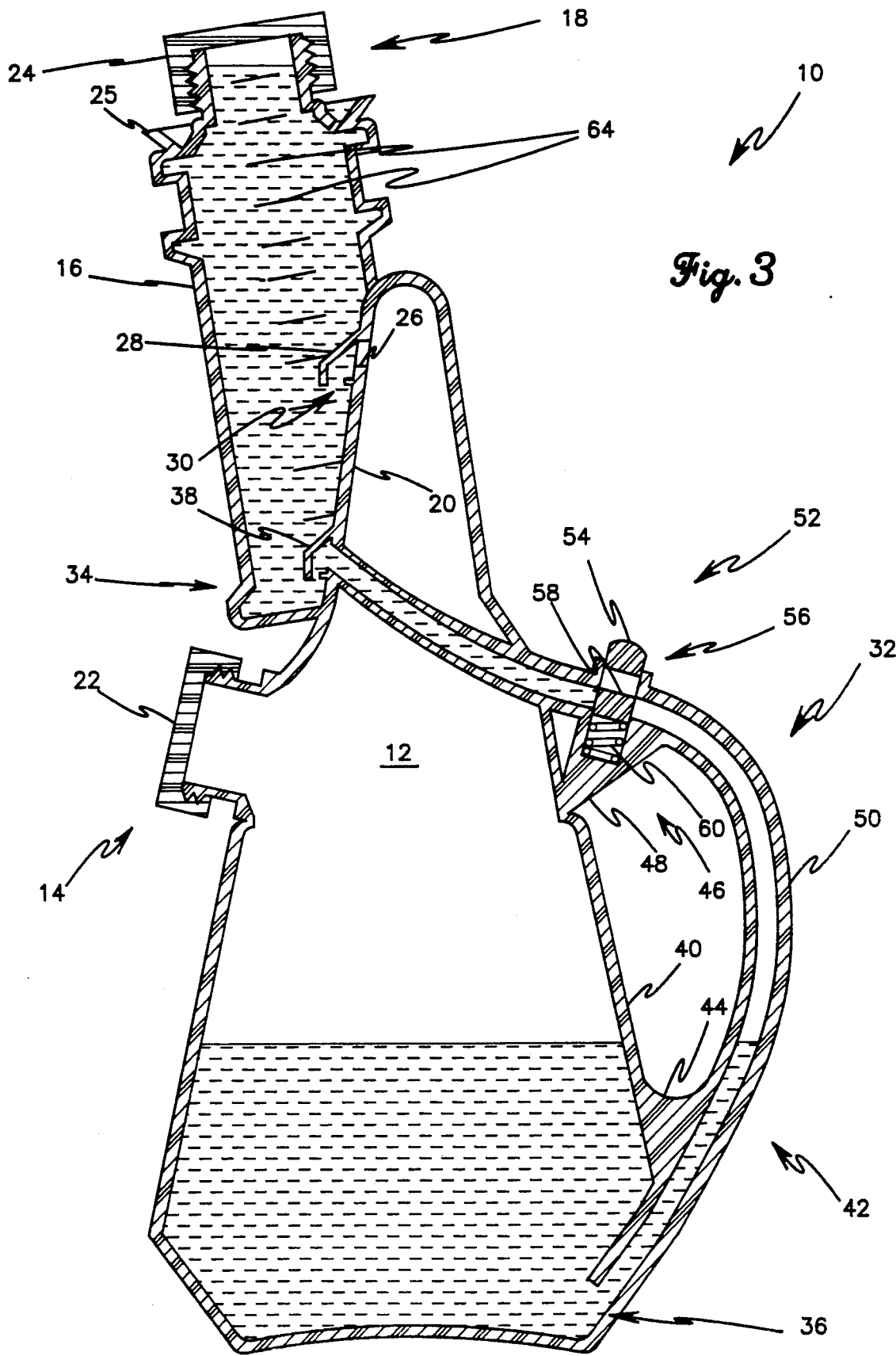
FIG. 3 is a cross sectional, side elevational view of the invention returned to the upright position, with the measuring chamber filled, and with excess liquid returned to the storage chamber.

Bottle 10 is then uprighted, as seen in FIG. 3. Preferably, measuring vessel 16 is dimensioned and configured to contain a predetermined quantity of liquid when these steps are followed. If this predetermined quantity coincides with a desired dose to be dispensed, then cap 24 is removed, and the measured liquid is dispensed by pouring.

It is also possible to measure a smaller quantity for dispensing. In an alternative embodiment, graduated indicia 64 are provided on measuring vessel 16 so that the user can see the level of liquid therein. With bottle 10 upright, valve 50 is held open, and liquid flows back to storage container 12. Air is displaced from storage container 12, and flows into measuring vessel 16 through passageway 26. Liquid level in measuring vessel 16 drops as excess liquid is released back to storage container 12. Precise measurement is obtained by correlating liquid level to indicia 64.

Flow of air and liquid as described herein will occur satisfactorily when bottle 10 is configured as shown and described. Therefore, it is important that passageway 26 be open to measuring vessel 16 at a point higher than that at which liquid conduit 32 opens to measuring vessel 16.

Indicia 64 may take several forms. If bottle 10 is transparent or translucent, indicia 64 can be printed thereon or be molded in the wall of measuring vessel 16. If bottle 10 is opaque, a transparent or translucent portion (not shown) may be provided, thus providing a window into measuring vessel 16, so that liquid level is observed as described above.

It is to be understood that the present invention is not limited to the embodiments described above, but encompasses any and all embodiments within the scope of the following claims.

I claim:

1. A measuring and dispensing bottle having:
   a storage container for holding a large quantity of liquid for subsequent measuring and dispensing, said storage container having an interior and including means defining a refill opening, and a first closure for sealing said refill opening;
   a measuring vessel for measuring and dispensing the contained liquid, having an interior and means defining a dispensing opening, and a second closure for sealing said dispensing opening;
   means defining a passageway extending and communicating between said storage container and said measuring vessel, there being a first opening open to said storage container interior and a second opening open to said measuring vessel interior;
   a liquid return conduit communicating and extending between said storage container and said measuring vessel, having a third opening open to said storage container interior and a fourth opening open to said measuring vessel interior, said third and fourth openings being located at respective lowermost portions of said storage container interior and said measuring vessel interior, said liquid return conduit further including a manually operated valve selectively releasing excess liquid from back to said storage container from said measuring vessel, whereby liquid is poured from said storage container to said measuring vessel, air contained within said measuring vessel being displaced to said storage container through said liquid return conduit, when said measuring and dispensing bottle is inverted and said valve is opened; excess liquid is recirculated back to said storage container through said liquid return conduit when said measuring and dispensing bottle is turned upright and said valve is opened, a desired quantity of liquid thus remaining in said measuring vessel for dispensing when said vessel closure is removed.

2. The measuring and dispensing bottle according to claim 1, said measuring vessel holding a predetermined quantity of liquid, whereby said predetermined quantity, of liquid is subsequently dispensed.

3. The measuring and dispensing bottle according to claim 1, there being indicia located on %aid measuring vessel whereby a desired quantity of liquid is measured by filling said measuring vessel and selectively recirculating a portion of liquid from said measuring vessel to said storage container by opening said valve.

4. The measuring and dispensing bottle according to claim 1, said passageway second opening being open to said measuring vessel at a point higher than said liquid return conduit fourth opening.

5. The measuring and dispensing bottle according to claim 1, said liquid return conduit diverging from said storage container at an inclination at a point of divergence therefrom, and converging with and rejoining said measuring and dispensing bottle at an inclination at a point of convergence, said liquid return conduit being spaced apart from said measuring and dispensing bottle between said point of divergence and said point of convergence, whereby a closed loop is formed, having an internal opening, thereby enabling a user to hold said measuring and dispensing bottle by grasping said liquid return conduit, said valve having operating means comprising a manually depressed button disposed proximate one of said points of divergence and convergence, whereby a user can depress said button by the same hand grasping said measuring and dispensing bottle.

6. The measuring and dispensing bottle according to claim 1, said passageway having a first terminal within said measuring vessel, and said liquid return conduit having a second terminal, said first and second terminals having hood means causing said passageway second opening and said liquid return conduit fourth opening to open downwardly in said measuring vessel interior.

7. A measuring and dispensing bottle having:
 a storage container for holding a large quantity of liquid for subsequent measuring and dispensing, said storage container having an interior and including means defining a refill opening, and a first closure for sealing said refill opening;
 a measuring vessel for measuring and dispensing the contained liquid, having an interior and means defining a dispensing opening, and a second closure for sealing said dispensing opening, there being indicia located on said measuring vessel, whereby a desired quantity of liquid is measured therein;
 means defining a passageway extending and communicating between said storage container and said measuring vessel, there being a first opening open to said storage container interior and a second opening open to said measuring vessel interior, said passageway second opening being open to said measuring vessel at a point higher than said liquid return conduit fourth opening;
 a liquid return conduit communicating and extending between said storage container and said measuring vessel, having a third opening open to said storage container interior and a fourth opening open to said measuring vessel interior, said third and fourth openings being located at respective lowermost portions of said storage container interior and said measuring vessel interior, said liquid return conduit further including a manually operated valve selectively releasing excess liquid from back to said storage container from said measuring vessel, said liquid return conduit diverging from said storage container at an inclination at a point of divergence therefrom, and converging with and rejoining said measuring and dispensing bottle at an inclination at a point of convergence, said liquid return conduit being spaced apart from said measuring and dispensing bottle between said point of divergence and said point of convergence, whereby a closed loop is formed, having an internal opening, thereby enabling a user to hold said measuring and dispensing bottle by grasping said liquid return conduit, said valve having operating means comprising a manually depressed button disposed proximate one of said points of divergence and convergence, whereby a user can depress said button by the same hand grasping said measuring and dispensing bottle,
 said passageway having a first terminal within said measuring vessel, and said liquid return conduit having a second terminal, said first and second terminals having hood means causing said passageway second opening and said liquid return conduit fourth opening to open downwardly in said measuring vessel interior,
 whereby liquid is poured from said storage container to said measuring vessel, air contained within said measuring vessel being displaced to said storage container through said liquid return conduit, when said measuring and dispensing bottle is inverted and said valve is opened; excess liquid is recirculated back to said storage container through said liquid return conduit when said measuring and dispensing bottle is turned upright and said valve is opened, a desired quantity of liquid thus remaining in said measuring vessel for dispensing when said vessel closure is removed.

* * * * *